United States Patent
Lawrence

(10) Patent No.: US 8,392,483 B2
(45) Date of Patent: Mar. 5, 2013

(54) ONTOLOGICAL DATABASE DESIGN

(75) Inventor: Peter John Lawrence, Hudson, OH (US)

(73) Assignee: Matrikon Inc., Edmonton (CA)

( * ) Notice: Subject to any disclaimer, the term of this patent is extended or adjusted under 35 U.S.C. 154(b) by 180 days.

(21) Appl. No.: 12/515,533

(22) PCT Filed: Nov. 20, 2007

(86) PCT No.: PCT/CA2007/002095
§ 371 (c)(1),
(2), (4) Date: May 19, 2009

(87) PCT Pub. No.: WO2008/061358
PCT Pub. Date: May 29, 2008

(65) Prior Publication Data
US 2010/0063982 A1    Mar. 11, 2010

Related U.S. Application Data

(60) Provisional application No. 60/866,557, filed on Nov. 20, 2006.

(51) Int. Cl.
*G06F 17/30* (2006.01)
(52) U.S. Cl. .................................................... 707/899
(58) Field of Classification Search .................. 707/794, 707/802
See application file for complete search history.

(56) References Cited

U.S. PATENT DOCUMENTS

| | | | |
|---|---|---|---|
| 7,013,308 | B1 | 3/2006 | Tunstall-Pedoe |
| 7,580,918 | B2* | 8/2009 | Chang et al. .......................... 1/1 |
| 8,055,661 | B2* | 11/2011 | Lee et al. ...................... 707/737 |
| 2002/0173971 | A1 | 11/2002 | Stirpe |
| 2004/0010483 | A1* | 1/2004 | Brands et al. ................... 706/45 |
| 2004/0010491 | A1* | 1/2004 | Riedinger ......................... 707/3 |
| 2004/0039564 | A1 | 2/2004 | Mueller |
| 2006/0053172 | A1* | 3/2006 | Gardner et al. .............. 707/203 |
| 2007/0282821 | A1* | 12/2007 | Chang et al. ...................... 707/4 |
| 2008/0040308 | A1* | 2/2008 | Ranganathan et al. ........... 707/1 |

FOREIGN PATENT DOCUMENTS

WO        03/073374 A2        9/2003

OTHER PUBLICATIONS

Chen, H., et al., "Intelligent Agents Meet the Semantic Web in Smart Spaces," IEEE Internet Computing 8(6):69-79, Nov./Dec. 2004.

Extended European Search Report mailed Jul. 6, 2011, issued in corresponding European Application No. EP 07 84 5563, filed May 27, 2009, 7 pages.

Ko, M.S., et al., "The Storage and Retrieval System for Online News Based on OWL," Proceedings of the 7th International Conference on Advanced Communication Technology (ICACT 2005), Phoenix Park, South Korea, Feb. 21-23, 2005, vol. 2, pp. 1360-1364.

Stumme, G., et al., "Semantic Web Mining: State of the Art and Future Directions," Web Semantics: Science, Services and Agents on the World Wide Web 4(2):124-143, Jun. 2006.

(Continued)

*Primary Examiner* — Don Wong
*Assistant Examiner* — Mohammad Kabir
(74) *Attorney, Agent, or Firm* — Christensen O'Connor Johnson Kindness PLLC

(57) ABSTRACT

An Ontological database having a memory for storing data and a data structure stored in the memory that operates with ontological inferencing rules. The ontological database is characterized by a relational database incorporated in the data structure, along with a temporal and a transactional framework imposed upon the ontological inferencing rules.

6 Claims, 1 Drawing Sheet

OTHER PUBLICATIONS

Younas, M., et al., "An Efficient Transaction Commit Protocol for Composite Web Services," Proceedings of the IEEE 20th International Conference on Advanced Information Networking and Applications (AINA 2006), Vienna, Apr. 18-20, 2006, vol. 2. pp. 124-143.

* cited by examiner

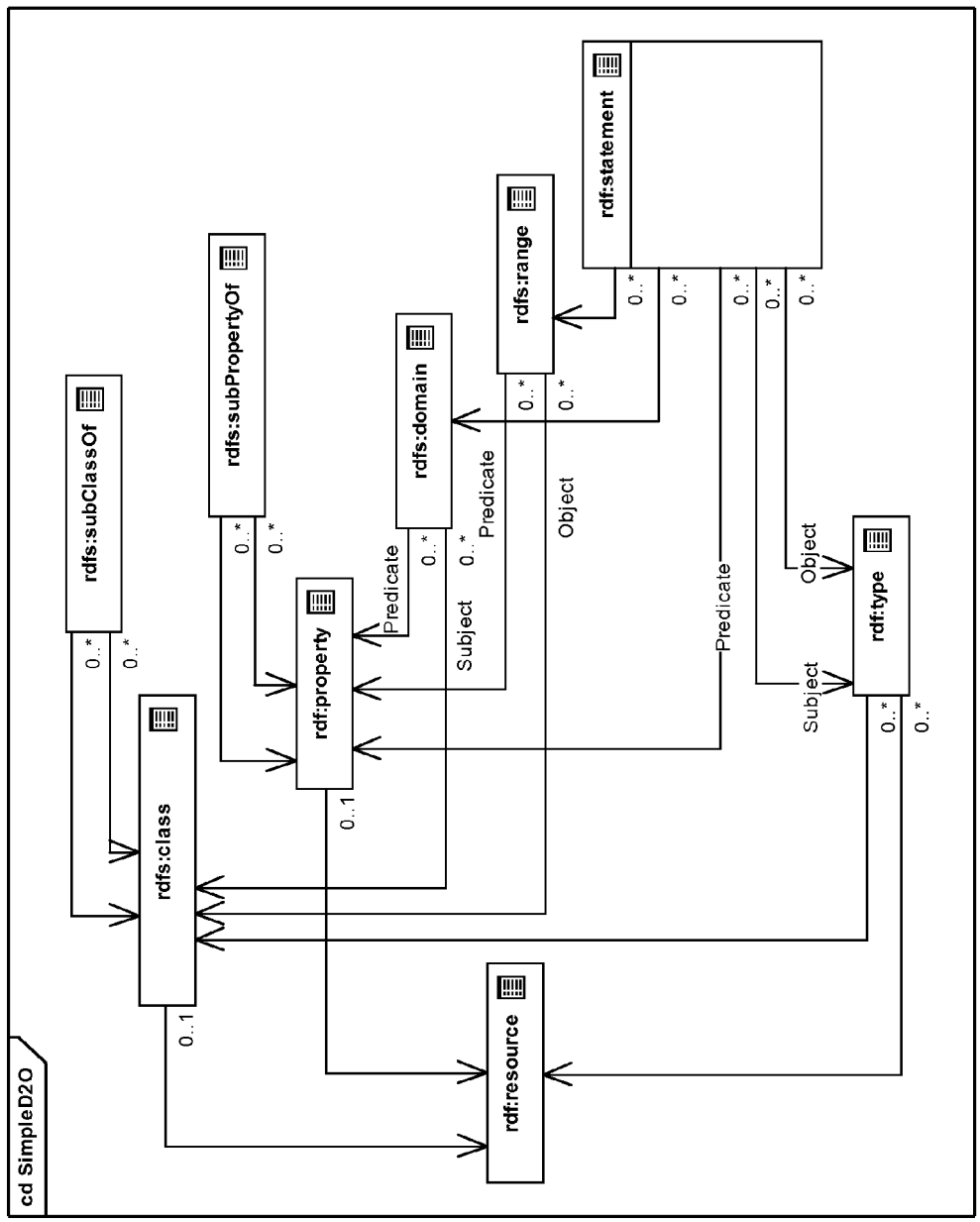

ONTOLOGICAL DATABASE DESIGN

FIELD

The present invention relates to an ontological database that operates in accordance with ontological rules.

BACKGROUND

Every ontological database uses as its foundation Resource Description Framework (RDF), Resource Description Framework Schema (RDFS) and Web Ontology Language (which has come to be known as OWL). RDF is the simple notion that any knowledge can be represented as a tuple or statement containing a subject, predicate, and object. While RDF does not impose any constraints on the values for the subject, predicates, and objects; RDFS adds rules. After RDFS was introduced, it was recognized that there was a need for a 'rules' language that allowed patterns of knowledge to be expressed as rules. OWL was developed to allow knowledge to be inferred from an existing set of RDF information, using inferencing rules.

SUMMARY

There is provided an Ontological database having a memory for storing data and a data structure stored in the memory that operates with ontological inferencing rules. The ontological database is characterized by a relational database incorporated in the data structure, along with a temporal and a transactional framework imposed upon the ontological inferencing rules.

BRIEF DESCRIPTION OF THE DRAWINGS

These and other features will become more apparent from the following description in which reference is made to the appended drawing, the drawing is for the purpose of illustration only and is not intended to be in any way limiting, wherein:

THE FIGURE is a database schema used in an ontological database.

DETAILED DESCRIPTION

The proposed ontological database design, hereinafter referred to as D2O, will now be described and compared with known database design methodologies.

1 Summary

Databases are based on logical 'tuples': These tuples are usually stored as records in tables. Commercial and non-commercial databases can handle vast numbers of records: entering new records rapidly, searching for particular data etc have all been highly optimized.

Relationships are defined between these tuples/tables restricting the values that the records may take. The creation of the relationship rules, sometimes called normalization, ensures the purity of the stored information. For example a correctly normalized database should not allow contradictory information to be stored.

The procedure for designing the table structure and the relationship rules is known as the database design methodology. Several exist such as the original Entity-Relationship modelling; Object-Role-Modelling, and Objective-SQL among others.

Deficiencies of relational database design methodologies include:

The database design is usually the cornerstone of an application or system. Changes to the database design ripple throughout the implementation affecting interfaces to other systems, user interfaces, and transaction design. Consequently an imperfect database design adversely affects implementation.

Database design methodologies are not well established, so there are many poorly designed databases. These manifest themselves by being able to store contradictory information, data is deleted then causing the database to contain misleading data, report queries are overly complex requiring inefficient predicates.

Recently a lot of attention has been focussed on the 'Semantic Web': a methodology for describing the semantic content of Web-based documents. This is based on RDF: Resource Description Framework which assumes 'everything' can be described by tuples of the form {subject, predicate, object} where each are 'resources'.

RDFS: Resource Description Framework Schema which adds some 'rules' to constrain the values of subjects, predicates, and objects, limiting them to domains and ranges.

OWL: Web Ontology Language which adds further restrictions to the values of subjects, predicates, and objects.

Although still in its infancy, we observe some deficiencies within the RDF/RDFS/OWL technologies with respect to how it can be used as a database design or deployment methodology.

It does not have the concept of a transaction which changes the document from one valid state to another.

It does not handling information that inherently changes over time. Storage of the documents has been limited to web documents or databases of statements.

D2O brings the concepts of the Semantic Web as a database design methodology to relational databases. It offers these advantages:

The D2O database design is fixed with respect to table structure, relationships, and indices. In fact the D2O database design follows the generally accepted normalizations: 3NF, 4NF, 5NF, and most of DKNF rules.

The 'database design' is replaced by an ontology which is described by data stored in the same database. This is akin to a Turing machine in which both program and data are stored in the same 'memory'.

The 'database design' can be designed using Ontology design tools and imported into D2O. Conversely the ontology contained within D2O can be exported into a standard form.

D2O introduces the concept of an ontological transaction in which the state of the D2O database before and after the transaction remains consistent with the defined ontology.

D2O extends, but does not violate, the RDF/RDFS structure to inherently handle the temporal evolution of information or knowledge stored in the database.

2 Database Modelling Methodology

Databases are useful for storing and retrieving efficiently large quantities of information. However they cannot be treated as trash-cans of data: if data is simply thrown into a database without any particular organization, then we cannot expect to extract much useful information from that data.

Therefore it is important to organize the database structure so that the data can be stored and subsequently retrieved without any issues.

Creating a database design to store and retrieve information usually follows one of the established 'methodologies'. These methodologies enable well-designed schemas to be deduced from the data modelling problem.

2.1 Relational. Database Design Methodologies

There are multiple methodologies available for the design and implementation of a relational database design. The goal of all of these is to construct a database design or schema that captures all of the data and information within the table structure. Some methodologies go further in specifying the referential integrity rules required to support the integrity of the information when it is selected, inserted, updated, or deleted from the database tables:

Entity-Relationship Modelling

The grandfather of all modelling methodologies in which all of the entities or 'things' are identified and then all relationships that exist between these entities.

Object-Role-Modelling

A venerable but not widely adopted methodology in which all objects (roughly equivalent to entities) are identified and the relationships are then identified as the roles one object performs with respect to another. It was derived from NIAM: Natural language, or Niam[1], Information Analysis Method.

[1] The name of the originator of this methodology.

Extended Relational Analysis

An efficient method for creating relational models, that moves from modelling the entities, then the relations and finally the attributes.

Objective-SQL

This is the basis of Resolution-Repositories database design. At its core is an object database design, deployed in a relational database. An object-orientated design only supports object attributes, not relationships. Therefore Objective-SQL extends this with fragments of data models which model particular facets of behaviour. Instances of classes (objects) can then exhibit these facets of behaviour if the class has been permitted to do so. In this way different problem-spaces can be modelled without changing the underlying or core database structure.

Although modelling methodologies are not completely represented by the above four, they represent a trend from the model-as-table-structure to the model-as-data, discussed in the next section.

2.1.1 Deficiencies of Relational Database Design Methodologies

Deficiencies of relational database design methodologies include:

The database design is usually the cornerstone of an application or system. Changes to the database design ripple throughout the implementation affecting interfaces to other systems, user interface and transaction design. Consequently an imperfect database design adversely affects implementation.

Database design methodologies are not well established, so there are many poorly designed databases. These manifest themselves by being able to store contradictory information, data is deleted then causing the database to contain misleading data, report queries are overly complex requiring inefficient predicates.

2.2 Data Driven Database Designs

The database is at the core of any application, program, or integration strategy. Because of its position at the core, changes to the database design can have significant impact on the applications that are layered above the database. Consequently one is always striving to minimize the damage such design changes would make. The approaches to change-minimization are:

1. Use a well established, 'standard' database design.
2. Wrap the database with a standard API that disguises or hides the underlying table structure.
3. Implement a data-driven design in which the way in which information is stored in the database can be changed by changing a meta-model, and hence only data, rather than the data structure itself.

Objective-SQL methodology is primarily a data-driven data-model. The following changes may be made to a deployed system without changing the underlying data structure:

1. New classes of objects can be defined at any time.
2. Classes may have user-defined attributes, which can change over time.
3. Classes may exhibit one or more behaviour facets, which can be modified over time.
4. The behaviours can be adapted to more precisely match the underlying information Repository Example

| AttachItem | | | Rsrc_Case_QPMCSI | | |
|---|---|---|---|---|---|
| LocationItem | AttachmentType | Attachitem | Resource | Criteria | Value |
| TankFarm10 | hasTanks | Tank101 | Tank101 | Level | 42 |
| TankFarm10 | hasTanks | Tank102 | Tank101 | Commodity | Naphtha |
| ... | ... | ... | ... | ... | ... |

Where AttachItem and Rsrc_Case_QPMCSI are two tables from the Resolution-Repository database implementation.

Only if new behaviour facets need to be added, is there a need to change the underlying database schema.

Thus a feature that distinguishes Objective-SQL is how the database design can evolve over time, even after the initial schema has been deployed.

2.3 Semantic Web

An initiative attributed to Tim Berners-Lee is the Semantic Web, in which the WWW moves beyond distributed documents, to distributed information. The vision of the 'Semantic Web' is the ability to query the web for answers such as 'find all instances in which a social worker was bitten by a black cat whilst on a house-call' or other useful information.

The technological foundation of the Semantic Web is made up of:
  RDF: Resource Description Framework
  RDFS: Resource Description Framework Schema
  OWL: Web Ontology Language Interestingly, most of the technology for the Semantic Web is being derived from Artificial Intelligence, Knowledge Engineering etc. Little within the Semantic Web initiatives has been drawn from the traditional database and data-management technologies.

2.3.1 RDF: Resource Description Framework

RDF is the simple notion that any knowledge can be represented as the tuple or statement:
  {subject, predicate, object}

| D2O rdf: statement | | |
|---|---|---|
| Subject | Predicate | Object |
| Tank101 | Level | 42 |
| Tank101 | Commodity | Naphtha |
| TankFarm10 | hasTanks | Tank101 |
| TankFarm10 | hasTanks | Tank102 |
| ... | ... | ... |

Within the world of the SemanticWeb, this usually means including the appropriate XML within an existing web (HTML) document:

```
<?xml version="1.0"?>
<rdf:RDF xmlns:rdf=http://www.w3.org/1999/02/22-rdf-syntax ns#
  xmlns:resolution="http://www.matrikon.com/resolution#">
    <resolution:Tank
  rdf:about="http://www.matrikon.com/resolution#Tank101">
      <resolution:Level>42</resolution:Level >
      <resolution:Commodity
  rdf:resource="http://www.matrikon.com/resolution#Naphtha"/>
    </resolution:Tank>
    <resolution:TankFarm
  rdf:about="http://www.matrikon.com/resolution#TankFarm10">
      <resolution:hasTanks
  rdf:resource="http://www.matrikon.com/resolution#Tank101"/>
      <resolution:hasTanks
  rdf:resource="http://www.matrikon.com/resolution#Tank102"/>
    </resolution:TankFarm>
</rdf:RDF>
```

Since RDF is usually embedded in a web document, there are some issues that need to be resolved:
  How do we ensure the syntax of the RDF statements?
  How do we control the meaning of the RDF statements?
  How do track changes to the information?
  How do we ensure that when we change or edit the RDF information it is transformed from one valid state to another?

Our first question: How do we ensure the syntax of the RDF statements? is answered by including the xmlns:rdf=http://www.w3.org/1999/02/22-rdf-syntax ns#

Our second question: How do we control the meaning of the RDF statements? is answered in the following sections.

2.3.2 RDFS: Resource Description FrameworkSchema

RDF does not impose any constraints on the values for the subject, predicates, and objects. RDF Schema adds these rules:
  rdfs:class/rdfs:subclass
  Declares different classes and their sub-classes.
  rdf:type
  Instances of classes
  Note that resources can be instances of zero, one or many classes
  Class membership can be inferred from behaviour
  rdf:property/rdfs:subpropertyof
  Declares different predicates (properties) and sub-properties.
  Properties not tied to a class as in O-O
  rdfs:range
  Declares the 'rules' of a property: which classes of resources can be the 'object' of the predicate
  rdfs:domain
  Declares the 'rules' of a property: which classes of resources can be the 'subject' of the predicate

2.3.3 OWL: Web Ontology Language

After RDFS was introduced, a need arose for a 'rules' language that allowed patterns of knowledge to be expressed as rules. Knowledge can then be inferred from an existing set of RDF information using an inference engine.

2.3.4 Deficiencies of the Semantic Web

It may seem unfair to criticize a technology so early in its life. However the following observations relate to how the concepts within the semantic web can be used as a database design or deployment methodology.

The semantic web originates from the need to describe the semantic content of a web document. In the 'database' world we wish to describe not only the current state of the document, but manage the changes of the state of the document form its initial concept. In database terms we ensure that each change to the 'document' is part of a transaction that ensures the state of the information before and after the transaction is still correct.

The temporal evolution of information in a database requires special attention: does each state of the temporal data meet the referential constraints, how do we manage ranges of time etc. So far little attention has been applied to this problem in the semantic web environment. In fact common semantic web examples have statements such as 'John', 'HasAge', '21', which clearly will become incorrect without time-series handling.

Querying the semantic web has been central to the research, after all it is the ability to search the web for the semantic content that has motivate most of the development. This has led to the SPARQL query language. The storage of the web documents has, of course, not had that much attention as it is assumed these documents would be available as XML/XHTML etc documents. However if we are to create ontologies with vast numbers of statements, it seems to make sense to use the technology already available within relational databases to store them.

2.4 Ontological Database Design Methodology

The objective of D2O is not to create a database for storing large ontologies, which is the emphasis of ontological databases such as Jena. Instead the emphasis of D2O is to be a methodology for implementing relational database design in such a way that the database 'schema' can be changed simply by changing the data stored rather than the database structure.

Thus the core of the D2O database is the database schema shown in the FIGURE. This same database schema is used for all implementations. The only difference between implementations is the data stored in the tables. Thus both the data and schema are stored within the same data structure. The rdf: resource and rdf:statement contain what would traditionally be regarded as 'data', whilst the remaining tables contain the meta-model that controls, via the inferencing, the contents of these tables. This parallels a 'Turing' engine computer: program and data are both stored in the same way and location.

D2O Database Transactions

The role of a database is not only that of storing data so that it may be subsequently retrieved. Databases are also the core of transactional systems. Database transactions are defined as follows:

A database transaction is a unit of interaction with a database management system or similar system that is treated in a coherent and reliable way independent of other transactions that must be either entirely completed or aborted. Ideally, a database system will guarantee all of the ACID properties for each transaction. In practice, these properties are often relaxed somewhat to provide better performance.

In databases, ACID stands for Atomicity, Consistency, Isolation, and Durability. They are considered to be the key transaction processing features/properties of a database management system, or DBMS. Without them, the integrity of the database cannot be guaranteed In practice, these properties are often relaxed somewhat to provide better performance.

In the context of databases, a single logical operation on the data is called a transaction. An example of a transaction is a transfer of funds from one account to another, even though it might consist of multiple individual operations (such as debiting one account and crediting another). The ACID properties guarantee that such transactions are processed reliably.

Atomicity refers to the ability of the DBMS to guarantee that either all of the tasks of a transaction are performed or none of them are. The transfer of funds can be completed or it can fail for a multitude of reasons, but atomicity guarantees that one account won't be debited if the other is not credited as well.

Consistency refers to the database being in a legal state when the transaction begins and when it ends. This means that a transaction can't break the rules, or integrity constraints, of the database. If an integrity constraint states that all accounts must have a positive balance, then any transaction violating this rule will be aborted.

Isolation refers to the ability of the application to make operations in a transaction appear isolated from all other operations. This means that no operation outside the transaction can ever see the data in an intermediate state; a bank manager can see the transferred funds on one account or the other, but never on both even if she ran her query while the transfer was still being processed. More formally, isolation means the transaction history (or schedule) is serializable. For performance reasons, this ability is the most often relaxed constraint. See the isolation article for more details.

Durability refers to the guarantee that once the user has been notified of success, the transaction will persist, and not be undone. This means it will survive system failure, and that the database system has checked the integrity constraints and won't need to abort the transaction. Typically, all transactions are written into a log that can be played back to recreate the system to its state right before the failure. A transaction can only be deemed committed after it is safely in the log.

The key features required are atomicity and consistency. All databases support atomicity, and most support consistency to a greater or lesser extent. However many databases are implemented without exploiting integrity constraints, leaving these to the application layer. Unfortunately this can mean that the database can be in an inconsistent state if the programmer does not consistently apply the integrity rules within their program.

One of the goals of D2O is to ensure consistency of the 'ontology' stored in the D2O database at all times. To achieve this we need to introduce the new concept of incremental inferencing.

The pattern of changes required is defined with a rule set.
The rule-set becomes a new 'class' within the ontology. The new class has domains and ranges defined that ensure the complete set of arguments.
Within the database the rule-set manifests itself as a virtual table.
Rules can be applied as if creating, reading, updating, and deleting (CRUD) from this virtual table

| Concept | Relational | Object-Orientated | Objective-SQL | RDF RDFS OWL | D2O |
|---|---|---|---|---|---|
| 'thing' | Entity | Object | Resource | Resource | Resource |
| Attribute | Attribute | Attribute | Criteria AttachmentType | Predicate | Predicate |
| Relationship | Relationship | Collection object | Behaviour Relationship | | Statement |
| Integrity | Referential Integrity Constraints | Code | Referential Integrity Constraints | rdfs: range, rdfs: domain, owl: restriction Plus after the fact Inferencing | rdfs: range, rdfs: Domain, owl: restriction plus Incremental Inferencing |
| Transactions | Transaction: Begin . . . Commit; End; | Code | Transaction: Begin . . . Commit; End; | None | Transaction only committed if incremental inferencing successful. All changes associated with single transaction tagged with transaction number |

3.1 Resolution 'Macros'

A cornerstone of the Resolution Objective-SQL methodology was the creation of database macros. The Resolution Objective-SQL database, at its core, consists of a catalogue of objects (known as resources) each of which is of a specific class (known as resourcetype). Additionally the database includes predefined relationships between subsets (known as foundation classes) of the resources. These relationships are grouped into behaviours.

Rather than modelling entities, Resolution models behaviours. For example there is no relationships predefined for a 'Tank', but there is behaviour of 'Inventory', which could be applied to a storage tank, a large vessel, a pipeline etc. Another example is that there is no table for describing a metering pump. However such an object could inherent the behaviours of 'Equipment' (exists as a tangible object within a cost-center), and 'Instrument' (a device that delivers one of more measurements).

The concept of a 'macro' is manipulating a pattern of information in the Resolution database as a unit-of-work, or transaction. For example the pattern maybe:

Tankmacro:
Something is a type TANK
It is attached to a TANKFARM type of resource
It has a 'level' measurement.

The first concept is that the declaration of this 'macro', allows a database view to be created that will return all occurrences of this 'pattern'.

However Resolution takes the concept of the macro further. As well as creating a view, Resolution also creates a corresponding database stored procedure that will create this 'pattern' in the database if it does not already exists. Similarly, stored procedures are automatically created for removing (deleting) and updating the 'pattern' within the database.

Thus we can find all occurrences of a pattern in the database, insert new patterns, update existing patterns, and finally remove a pattern from the database. Furthermore databases such as Oracle support the concept of an 'INSTEAD OF' trigger associated with a database view. Associating these procedures with the initially created database views means that the view can be treated as a table: pseudo-table. Applications can then create, read, update, and delete (CRUD) these patterns as if they were really in a table.

3.2 D2O Rules

D2O has a much simpler database structure, essentially consisting of only the 'statement' table. The {subject, predicate, object} can be viewed as representing arcs in a network or directed-graph. The subject and object are nodes within the graph; the labelled arc joining these nodes is identified by the predicate.

Thus within D2O, the concept of a 'pattern' is even stronger. The Resolution example can be expressed as these connected arcs within the graph:

```
TankRule{?tank, ?tankfarm, ?level}=>
    {?tank, TYPE, TANK}
    {?tankfarm, TYPE, TANKFARM}
    {?tankfarm, ATTACHED, ?tank}
    {?tank, HASLEVEL, ?level}
```

The Semantic Web has two similar and related technologies: SWRL, Semantic Web Rule Language, and SPARQL, a query language and data access protocol for the Semantic Web.

3.2.1 SWRL

SWRL is a method to declare rules that can infer the existing of one or more tuples (statements, or arcs within the directed-graph), when they are not explicitly stated as statements. For example, the ontology might describe:

Father, is FatherOf, Child.
We can then define with SWRL the rule
{?Child, is ChildOf, ?Father}=>{?Father, isfatherOf, ?Child}

In effect for every one actual statement, the SWRL rule can infer another. Of course, SWRL is targeted at more complex rules.

3.2.2 SPARQL

SPARQL is a query language that allows a query on an existing RDF model to identify a particular sub-graph. An example maybe[2]:

[2] The syntax of SPARQL is in a state of flux: this is taken from http://www.w3.org/TR/rdf-sparql-query/, the current release candidate for the standard.

```
SELECT ?Child ?Father
WHERE {?Father :isfatherOf ?Child}
```

However we can find more complex 'patterns':
GrandFathers:

```
SELECT      ?GrandChild ?GrandFather
WHERE {     ?GrandFather :isfatherOf ?Child .
            ?Child :isfatherOf ?GrandChild }
```

Clearly there is a strong similarity with a SQL database view.
Thus our TankRule could be rewritten as:
TankRule:

```
SELECT      ?tank ?tankfarm ?level
WHERE {     ?tank :TYPE :TANK .
            ?tankfarm :TYPE :TANKFARM .
            ?tankfarm :ATTACHED ?tank .
            ?tank :HASLEVEL ?level
            }
```

3.3 D2O Updateable Patterns

The Semantic web seems to focus on discovering patterns of data from existing RDF sources using the ontological description of those data sources.

In contrast a database is not only concerned with discovering information from the stored data, but also performing transactions that change the state of the database either by inserting new data, by updating, or by deleting existing data. To ensure the integrity of this information, a database uses the concept of a transaction. Ideally the integrity of the database will be unchanged by this transaction. If for any reason the transaction would damage the integrity, then the database should roll back the changes to the initial state.

With D2O, the SPARQL or SWRL rules are converted to SQL views:
GrandFathers:

```
Create view Grandfathers as
Select  s2.object GrandChild
,       s1.subject GrandFather
From    statement s1
,       statement s2
Where   s1.object = s2.subject
And     s1.predicate = 'isfatherOf'
And     s2.predicate = 'isfatherOf'
```

TankRule:

```
Create view TankRule as
Select s1.subject tankfarm
,       s2.subject tank
,       s2.object level
From statement s1
,       statement s2
Where s1.subject in (select t.rsrc from type t where t.class
='TANKFARM')
And   s2.subject in (select t.rsrc from type t where t.class ='TANK')
And   s1.object = s2.subject
And   s1.predicate = 'ATTACHED'
And   s2.predicate = 'HASLEVEL'
```

This allows us to retrieve data that matches the declared rule. However it is also desirable to create records that match the pattern
Insert TankRule:

```
Insert into Type(rsrc, class) values (tankfarm, 'TANKFARM')
Insert into Type(rsrc, class) values (tank, 'TANK')
Insert into Statement(subject, predicate, object) values (tankfarm,
   'ATTACHED', tank)
Insert into Statement(subject, predicate, object) values (tank,
   'HASLEVEL', level)
```

Note that there cannot be an 'Insert GrandFathers' rule since the complete primary key is not part of the selected variables.

Within a SQL database the 'Insert TankRule code can be associated with the TankRule view as an Instead-Of trigger: code that is executed whenever one tries to manipulate the data that appears in the view results.

3.4 D2O Transaction Tracking

During any transaction on the database, data may be inserted, updated or deleted. To track these transactions modifications are made as follows:

1. Each table has an additional column corresponding to the transaction number.
2. Each table has a companion table containing the audit information.
3. The companion audit table has the transaction number that causes the change.

The procedure for tracking transactions is as follows:
1. At the beginning of a new transaction, a new transaction number is assigned.
2. When any record is to be updated or deleted, the existing record is moved to the companion audit table, tagged with the new transaction number.
3. If during the same transaction, the same record is modified again it need not be added to the audit table.
4. When 'commit' is executed, the transaction number is incremented.

Thus we are able to identify the state of the database before and after the transaction. Thus it is possible to roll back this transaction, even after it has been committed.

4 D2O Time Series

Ontological statements inevitably change over time. For example the following statement:
    John, hasAge, 21
might have been valid when the ontology was created, but is sure to become invalid over time.

Of course there are 'workarounds' to this particular example. For example, instead of storing John's age, we could define his date-of-birth from which we can deduce his age at any time. However, there are still other examples such as the following with no such workaround:
    myOven, hasTemperature, 345 degF This type of time dependency can be termed a 'time-series' and frequently occurs in practise.

Time series can be tracked in an ontology by extending the concept of an RDF statement:
Statement(subject, predicate, object)->
    Statement(subject, predicate, object)(starting, ending)
    Where (starting, ending) is an annotation associated with the Statement And starting is the date/time from when this statement is applicable, defaulting to 0
    And ending is the date/time until this statement applies, defaulting to infinity.

Additionally the ontology has a record of all starting and ending date/times. These define all of the date/times at which the ontology has changed.

In between the starting and ending date/times the ontology must meet all of the rules defined by the RDFS and OWL rules, as illustrated in the diagram below.

| statement(subject, predicate, object, $T_s$, $T_e$) | $T_1$-$T_2$ | $T_2$-$T_3$ | $T_3$-$T_4$ | $T_4$-$T_5$ | $T_5$-$T_6$ | $T_6$-$T_7$ | $T_7$-$T_8$ |
|---|---|---|---|---|---|---|---|
| 1:M Cardinality Exaample | | | | | | | |
| TankFarm10, has Tanks, Tank101, $T_1$, $T_8$ | ←——————————————————————→ | | | | | | |
| TankFarm10, has Tanks, Tank102, $T_2$, $T_5$ | | ←——————————→ | | | | | |
| TankFarm10, has Tanks, Tank103, $T_4$, $T_8$ | | | | ←——————————————→ | | | |
| Note Tank102 added at $T_2$ removed at $T_5$ | | | | | | | |
| Note Tank103 added at $T_4$ | | | | | | | |
| 1:1 Cardinality Exaample | | | | | | | |
| Tank101, hasLevel, 42, $T_1$, $T_3$ | ←————————→ | | | | | | |
| Tank101, hasLevel, 43, $T_3$, $T_5$ | | | ←————————→ | | | | |
| Tank101, hasLevel, 44, $T_5$, $T_8$ | | | | | ←——————————→ | | |
| New hasLevel at $T_3$ supersedes prior statement otherwise 1:1 cardinality rule violated | | | | | | | |

| D2O | Subject | Subject Class | Predicate | Object | Object Class | Start | End |
|---|---|---|---|---|---|---|---|
| Resolution.AttachItem Example | AttachItem Tank101 | Attachment_tp CONE-ROOF | AttachmentType HasTanks | Location TankFarm10 | Location_tp OPERATING AREA | n/a — | n/a — |
| Resolution.Criteria Example | Resource Tank101 | Resource_tp CONE-ROOF | Case-Criteria Operating-Level | Value 42 | DataType N | Start 8:30 Jan. 12, 2003 | Until 9:30 Jan. 12, 2003 |
| Real-Time Database Example | Tag TC-102.PV | | hasTagValue | Value 42 | | Time 8:30 Jan. 12, 2003 | n/a |
| Object-Attribute-Value Example | Object Tank101 | CONEROOF | Attribute OperatingLevel | Value 42 | Datatype Float | — | — |
| Topic Map Example OPC-UA Example | Topic JohnDoe | Topic Type Employee | Association employed-by | Occurrence Matrikon | Occurrence Type Employer | n/a — | n/a — |

Under the assumption that each 'statement' is annotated with the 'starting' and ending time, it is then possible to reconstruct the RDF for any span of time.

4.1 RDF Reconstruction

The following view reconstructs the state of the RDF for any period. Note that starting and ending tables contain all starting and ending times. Thus the Cartesian join between these two tables creates all possible time ranges:

```
Select   r.subject
,        r.predicate
,        r.object
,        s.starting
,        e.ending
From     statement r
,        starting  s
,        ending    e
Where    e.ending > s.starting
```

'RDFS is used to control predicate's domains and ranges within RDF. It is also used to define the cardinality of predicates.

The interpretation of cardinality has to be adjusted to account for the time series, so that the cardinality rules are upheld for any time period.

For example, if a statement(subject, predicate, object, starting, ending) is to be asserted in the D2O database, whose predicate's cardinality is 1:1, and there is an existing record whose starting is less

```
Existing contents:   Statement(s1, p1, o1, start1, end1)
New statements:      Statement(s1, p1, o2, start2, end2)
Cardinality of p1:   1:1
                     start2 < start1
                     end2 > start1
                     end2 < end1
```

Without the starting and ending times, the new statement would clearly be inadmissible since it violates the cardinality constraints However the new statement overlaps with the existing statement. Thus we can have the following without violating the cardinality constraints of the ontology:

```
New contents:   Statement(s1, p1, o2, start2, start1)
                Statement(s1, p1, o1, start1, end1)
Or
New contents:   Statement(s1, p1, o2, start2, end2)
                Statement(s1, p1, o1, end2, end1)
```

Appendix: D2O.owl

The following is an OWL file defining the D2O core changes:

```xml
<?xml version="1.0"?>
<rdf:RDF
    xmlns:swrlb="http://www.w3.org/2003/11/swrlb#"
    xmlns:swrl="http://www.w3.org/2003/11/swrl#"
    xmlns:rdf="http://www.w3.org/1999/02/22-rdf-syntax-ns#"
    xmlns:xsd="http://www.w3.org/2001/XMLSchema#"
    xmlns:rdfs="http://www.w3.org/2000/01/rdf-schema#"
    xmlns:owl="http://www.w3.org/2002/07/owl#"
    xmlns="http://www.matrikon.com/ontology/d2o.owl#"
    xmlns:daml="http://www.daml.org/2001/03/daml+oil#"
    xmlns:sparql="http://www.topbraidcomposer.org/owl/2006/09/sparql.owl#"
    xml:base="http://www.matrikon.com/ontology/d2o.owl">
  <owl:Ontology rdf:about="">
    <owl:imports rdf:resource="http://www.w3.org/2003/11/swrl"/>
    <owl:versionInfo
 rdf:datatype="http://www.w3.org/2001/XMLSchema#string"
    >Created with TopBraid Composer</owl:versionInfo>
    <owl:imports
 rdf:resource="http://www.topbraidcomposer.org/owl/2006/09/sparql.owl"/>
```

```
            <owl:imports rdf:resource="http://www.w3.org/2003/11/swrlb"/>
        </owl:Ontology>
        <rdfs:Class rdf:ID="RDF">
            <rdfs:subClassOf rdf:resource="http://www.w3.org/2002/07/owl#Class"/>
        </rdfs:Class>
        <rdfs:Class rdf:ID="Owner">
            <rdfs:subClassOf rdf:resource="http://www.w3.org/2002/07/owl#Class"/>
        </rdfs:Class>
            <rdfs:Class rdf:ID="Calculation">
                <rdfs:subClassOf rdf:resource="http://www.w3.org/2002/07/owl#Class"/>
        </rdfs:Class>
        <owl:ObjectProperty rdf:ID="calculation">
            <rdfs:domain>
                <rdf:Description rdf:about="http://www.w3.org/1999/02/22-rdf-syntax-ns#Statement">
                    <rdfs:subClassOf>
                        <owl:Restriction>
                            <owl:onProperty>
                                <owl:DatatypeProperty rdf:ID="starting"/>
                            </owl:onProperty>
                            <owl:cardinality rdf:datatype="http://www.w3.org/2001/XMLSchema#int"
                                >1</owl:cardinality>
                        </owl:Restriction>
                    </rdfs:subClassOf>
                    <rdfs:subClassOf>
                        <owl:Restriction>
                            <owl:onProperty>
                                <owl:DatatypeProperty rdf:ID="ending"/>
                            </owl:onProperty>
                            <owl:cardinality rdf:datatype="http://www.w3.org/2001/XMLSchema#int"
                                >1</owl:cardinality>
                        </owl:Restriction>
                    </rdfs:subClassOf>
                </rdf:Description>
            </rdfs:domain>
            <rdfs:range rdf:resource="#Calculation"/>
        </owl:ObjectProperty>
        <owl:ObjectProperty rdf:ID="owner">
            <rdfs:range rdf:resource="#Owner"/>
            <rdfs:domain rdf:resource="http://www.w3.org/1999/02/22-rdf-syntax-ns#Statement"/>
        </owl:ObjectProperty>
    <owl:DatatypeProperty rdf:about="#starting">
            <rdfs:range rdf:resource="http://www.w3.org/2001/XMLSchema#dateTime"/>
            <rdfs:domain rdf:resource="http://www.w3.org/1999/02/22-rdf-syntax-ns#Statement"/>
        </owl:DatatypeProperty>
        <owl:DatatypeProperty rdf:ID="transaction">
            <rdfs:range rdf:resource="http://www.w3.org/2001/XMLSchema#int"/>
            <rdfs:domain rdf:resource="http://www.w3.org/1999/02/22-rdf-syntax-ns#Statement"/>
        </owl:DatatypeProperty>
        <owl:DatatypeProperty rdf:about="http://www.w3.org/1999/02/22-rdf-syntax-ns#value"/>
        <owl:DatatypeProperty rdf:about="#ending">
            <rdfs:range rdf:resource="http://www.w3.org/2001/XMLSchema#dateTime"/>
            <rdfs:domain rdf:resource="http://www.w3.org/1999/02/22-rdf-syntax-ns#Statement"/>
        </owl:DatatypeProperty>
</rdf:RDF>
```

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to understood to include what is specifically illustrated and described above, what is conceptually equivalent, and what can be obviously substituted. Those skilled in the art will appreciate that various adaptations and modifications of the described embodiments can be configured without departing from the scope of the claims.

The illustrated embodiments have been set forth only as examples and should not be taken as limiting the invention. It is to be understood that, within the scope of the following claims, the invention may be practiced other than as specifically illustrated and described.

What is claimed is:

1. An ontological database comprising a memory for storing data and a data structure stored in said memory that operates with ontological inferencing rules and ontological statements stored in the memory, characterized by:
   a relational database incorporated in the data structure; and
   a temporal framework including a series of temporal states imposed on the ontological inferencing rules, the series of temporal states comprising time series information, such that all ontological statements of the time series information are valid between two temporal states, the transactional framework creating an audit trail during each transaction that allows for transactions to be tracked; and a transactional framework imposed upon the ontological inferencing rules such that all ontological statements are atomic and consistent between transactional states.

2. The ontological database of claim 1, wherein the ontological inferencing rules include Resource Description Framework (RDF), Resource Description Framework Schema (RDFS) and Web Ontology Language (OWL).

3. The ontological database of claim 1, wherein the temporal framework and the transactional framework are imposed upon the ontological inferencing rules through incremental inferencing.

4. The ontological database of claim 1, wherein the transactional framework is imposed on changes to data that requires such change to data to meet rules concerning atomicity, consistency.

5. The ontological database of claim 1, wherein the data structure is linked to external sources of data, data being retrieved from such external sources and processed.

6. The ontological database of claim 1, wherein evaluation rules are provided that enable knowledge statements to be calculated by inserting retrieved data into formula.

* * * * *